Aug. 5, 1930.    E. J. HORNBERGER    1,772,148
CUT-OFF MACHINE
Filed Nov. 3, 1928    4 Sheets-Sheet 1
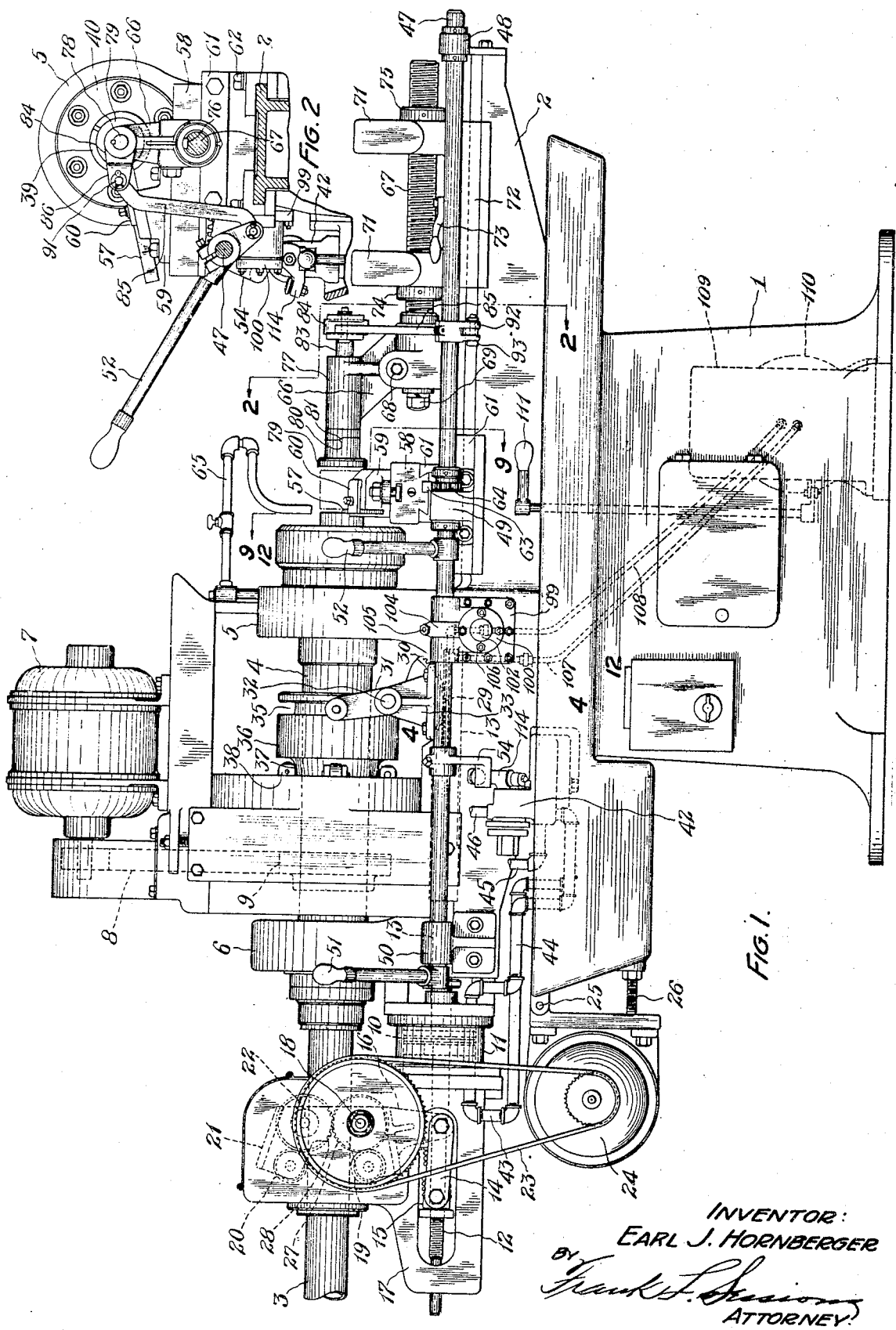
INVENTOR:
EARL J. HORNBERGER
BY
ATTORNEY

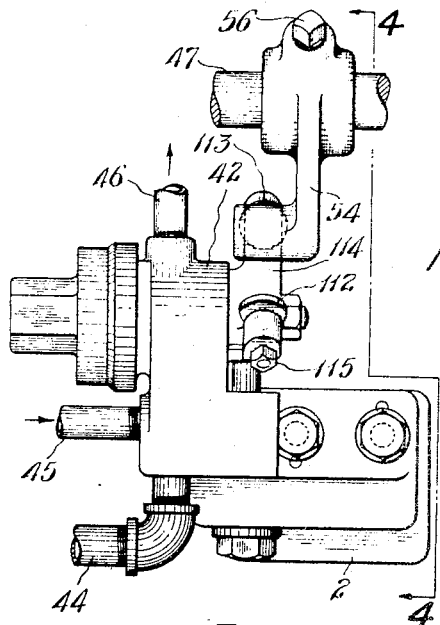
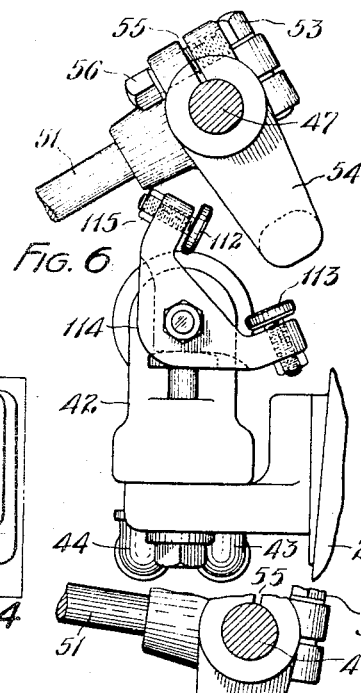
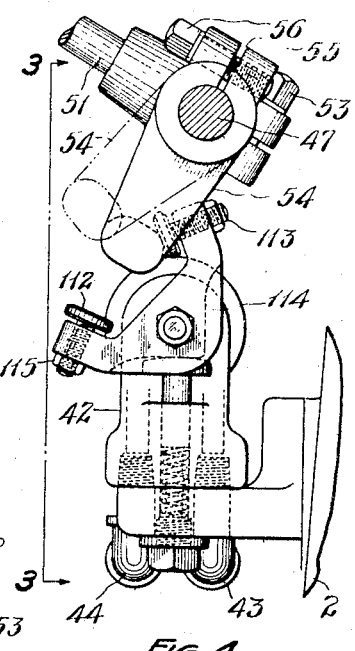
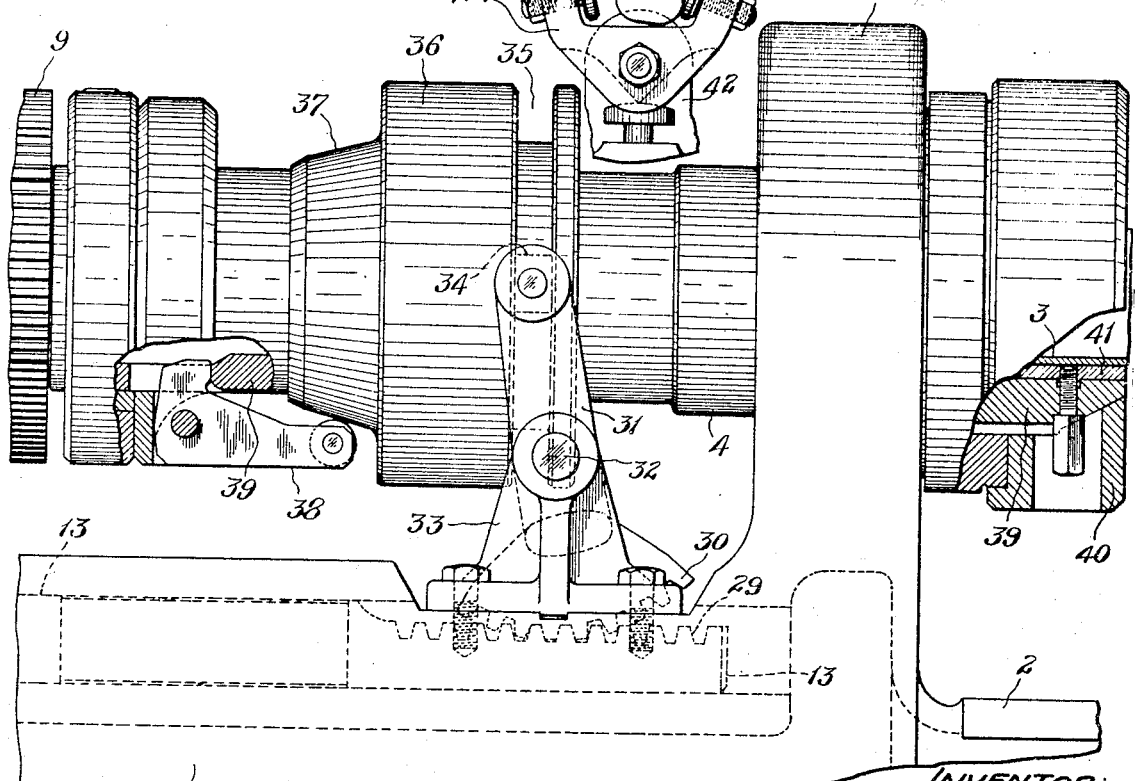

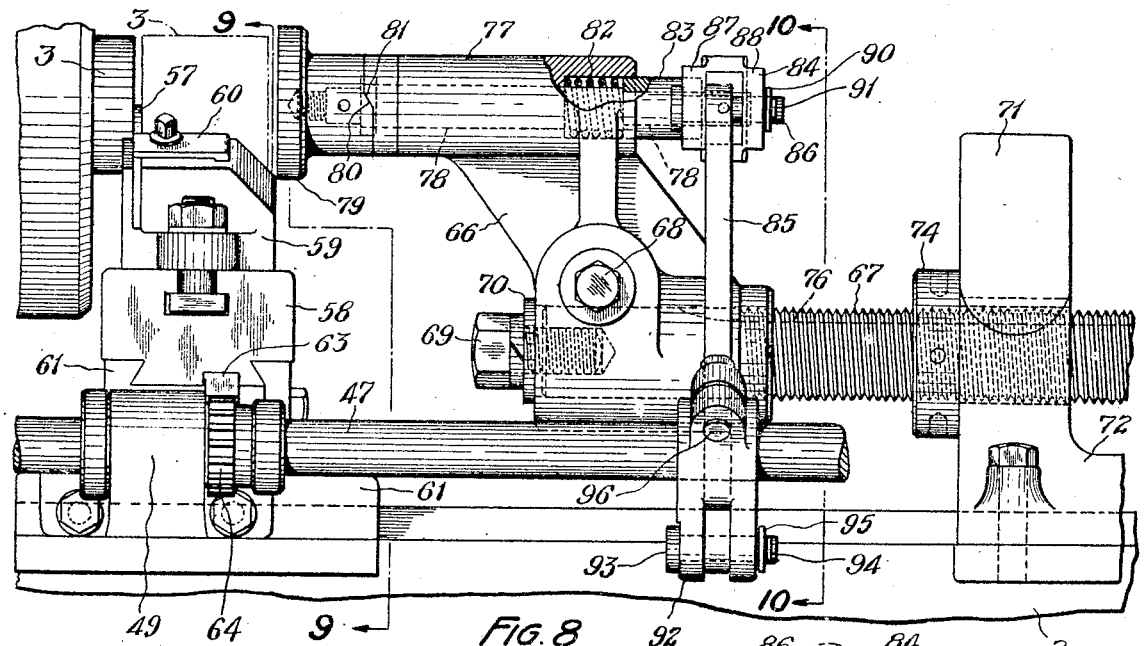

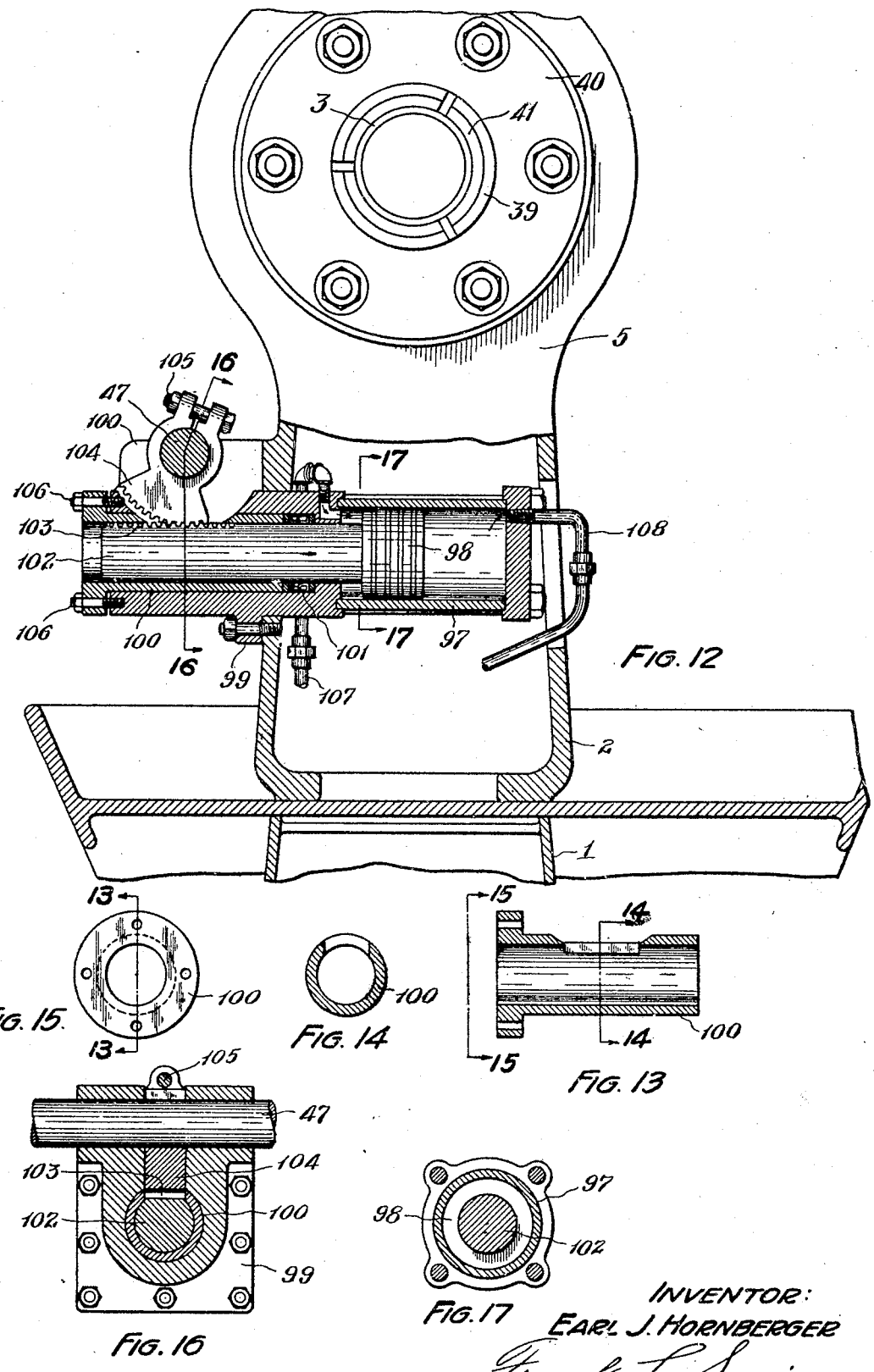

Patented Aug. 5, 1930

1,772,148

UNITED STATES PATENT OFFICE

EARL J. HORNBERGER, OF GERMANTOWN, PENNSYLVANIA, ASSIGNOR TO JOHN G. OLIVER, OF CLEVELAND, OHIO, DOING BUSINESS AS BARDONS & OLIVER

CUT-OFF MACHINE

Application filed November 3, 1928. Serial No. 317,027.

My invention relates to machine tools having a hollow spindle through which the stock is fed and in which the chuck which holds the work while the machining operations are being performed, is embodied. As shown in the drawings and described in the following specification my invention is incorporated in a machine for cutting off measured lengths of tube or bar stock.

Among the objects of my invention are: the provision of a machine for quickly and easily measuring and cutting off definite lengths of stock; the provision of a machine of the type described in which all the operations are controlled by a single shaft; the provision of a cut-off machine having a stock stop adapted to be positioned to measure any desired length of stock to be cut off and to be withdrawn from contact with the end of the stock while the cutting operation is taking place; the provision of the combination, in a single machine, of automatic stock feeding and chucking mechanism, cut-off tool, adjustable stock measuring stop adapted to be withdrawn from contact with the stock during the cutting operation and a single shaft adapted to control the operation of the machine; the provision of a cut-off machine in which the shaft which controls the operations of the machine may be operated either manually or by power; the provision of a cut-off machine in which the cut-off tool feed may be operated by a hydraulic cylinder; the provision, in a cut-off machine adapted to be operated either manually or by power, of means for disconnecting the power operating means when it is desired to manually operate the machine.

The drawings show and the specification describes my invention as adapted to cut off tube or pipe. However, it will be evident to those skilled in the art that it may be used for cutting off solid bar stock and performing other machining operations.

Referring to the drawings:

Fig. 1 is a side elevation of my cut-off machine showing position of parts when pipe has just been cut off and cut-off tool has been slightly withdrawn.

Fig. 2 is a section taken on line 2—2 of Fig. 1.

Fig. 3 is an enlarged side elevation of the fluid valve together with valve operating arm; valve and arm are in same position as in Fig. 1.

Fig. 4 is an enlarged end view of the fluid valve taken on line 4—4 of Figs. 1 and 3 showing position of valve, valve operating arm and hand lever when tool has finished cutting off a piece of tube and been drawn back until it just clears the stock.

Fig. 5 is a view similar to Fig. 4 showing the valve, valve operating arm and hand lever in their mid-position.

Fig. 6 is a view similar to Figs. 4 and 5 showing the valve, valve operating arm and hand lever in the opposite position from that shown in Figs. 1, 2, 3 and 4.

Fig. 7 is an enlarged side elevation, partly in section, of the rotating hollow spindle showing chuck operating mechanism.

Fig. 8 is an enlarged side elevation partly in section showing cut-off tool and stock stop, stop being in withdrawn position.

Fig. 9 is a section taken on line 9—9 of Figs. 1 and 8, cut-off tool in same position as in Figs. 1 and 2.

Fig. 10 is a section on line 10—10 of Fig. 8.

Fig. 11 is a side elevation of the stock stop showing it in stock measuring position.

Fig. 12 is a section on line 12—12 of Fig. 1, showing hydraulic cylinder.

Fig. 13 is a vertical longitudinal section through the piston rod supporting sleeve.

Fig. 14 is a section on line 14—14 of Fig. 13.

Fig. 15 is an end view, taken on line 15—15, of sleeve shown in Fig. 13.

Fig. 16 is a section taken on line 16—16 of Fig. 12.

Fig. 17 is a section taken on line 17—17 of Fig. 12.

In the machine shown and described in this application I have embodied the automatic chuck and roller feed mechanism disclosed in my United States Patent No. 1,696,037, issued Dec. 18, 1928 and I do not claim this mechanism in this application except in combination with the other features of my cut-off machine.

My invention is shown applied to a common type of hollow spindle lathe. The base 1 supports the lathe bed 2. The stock 3, shown in the drawings as a piece of tubing, passes through the hollow rotatable spindle 4 which is mounted in bearings in the brackets 5 and 6. The motor 7 drives the spindle 4 through the silent chain 8 and sprocket 9 which is mounted on the spindle 4.

The stock feeding and chuck operating mechanism is mounted on the left end of the machine as shown in Fig. 1. The piston 10 operates in the cylinder 11, and a double ended piston rod extends out of the ends of the cylinder. One end 12 of the rod operates the stock feeding means and the other end 13 operates the stock chucking means. A link 14 is pivoted to a collar 15 which is moved by the piston rod 12. An arm 16 is pivoted to the other end of link 14 and also rotatably mounted on the shaft 18. Said shaft 18 is supported by the frame 17. A stock feeding roll 19 is rotatably mounted on the arm 16. A second stock feeding roll 20 is rotatably mounted on a swinging bracket 21 which is supported in the frame 17 by the shaft 22. The rolls 19 and 20 are continuously driven in a direction tending to feed the stock into the machine. A series of gears and a silent chain 23 connect the rolls 19 and 20 with the driving motor 24. This motor 24 is hinged to the base 1 on the pin 25. An adjusting screw 26 serves to swing the motor up or down on this pin and thus adjust the tension on the driving chain 23. The roll supporting arm 16 and bracket 21 are made to move simultaneously on their pivots by the intermeshing gear segments 27 and 28, which are integral parts of arm 16 and bracket 21 respectively. Thus, when the arm 16 is moved by the link 14, the bracket 21 will have a corresponding movement and the rolls 19 and 20 will be simultaneously moved into or out of contact with the stock 3.

The piston rod 13 is adapted to slide in bearings in the bed 2 of the machine. A rack 29 on the end of piston rod 13 meshes with the gear segment 30 which is attached to the lower end of arm 31. Arm 31 is pivoted on the pins 32 which are supported by the bracket 33 which is mounted on the bed 2 of the machine. When the piston rod 13 moves it swings the arm 31 on the pins 32 by means of the rack 29 and gear segment 30. Attached to the upper end of arm 31 is a block 34 which slides in a groove 35 in the chuck operating collar 36. Movement of the arm 31 slides the collar 36 on the spindle 4 and the tapered portion 37 of the collar 36 co-acts with the fingers 38 to operate the chuck in well-known manner. Thus when the piston rod 13 moves to the right (see Fig. 7) the top of the arm 31 will be moved to the left, carrying with it the collar 36. The fingers 38 will be forced out by the tapered portion 37 of the collar 36 and will push the split chuck sleeve 39 against the tapered ring 40 causing the split sleeve 39 to contract and the chuck jaws 41 to grip the stock 3. When the piston rod 13 is moved to the left the operations are reversed and the chuck releases the stock so that it can be fed through the hollow spindle 4.

The valve 42 controls the flow of compressed air or other fluid under pressure into and out of the cylinder 11. The pipes 43 and 44 conduct the fluid under pressure to the cylinder 11, each pipe acting alternately as a supply and an exhaust pipe as will be later explained.

The operation of the above described fluid pressure operated roller feed and chuck is the same as that fully described in my application Serial No. 152,880, although the apparatus is modified slightly from that shown in the above application. When the valve 42 is in the position shown in Figs. 3 and 4 the compressed air or other fluid under pressure passes into the valve 42 from the supply pipe 45 and out of the valve into the cylinder 11 through the pipe 43. The fluid pressure is then on the left side of the piston 10, the chuck is gripping the stock 3 and the stock feeding rolls 19 and 20 are held out of contact with the stock, as shown in Fig. 1. When the valve is in the position shown in Fig. 6 the fluid under pressure will pass from the supply pipe through valve 42 and pipe 44 into the right end of the cylinder 11. The pressure of the fluid forces the piston 10 to the left. This movement causes the chuck to release the stock and the feed rolls to be brought into contact with the stock.

When the valve is in the position to direct the fluid under pressure into the left end of the cylinder 11 (Fig. 1) through pipe 43 it also opens the right end to the atmosphere, pipe 44 conducting the exhaust to the valve 42 from which it is discharged through exhaust pipe 46. The situation is reversed when the valve is in the opposite position, pipe 44 being the feed pipe and pipe 43 conducting the exhaust to the valve where it is discharged through exhaust pipe 46.

The control shaft 47 is mounted in bearings 48, 49 and 50 which are attached to the machine bed 2. This shaft 47 extends the entire length of the bed 2 and is adapted to be rotated in its bearings either by the hand levers 51 and 52 or by the hydraulic cylinder, as will be later described. Two hand levers 51 and 52 are provided for the convenience of the operator. The function of each is the same. They are clamped on the shaft 47 by means of the screws 53 (Figs. 4 and 6) and may be readily moved longitudinally of the shaft or rotated on it when the screw 53 is loosened.

The valve operating dog 54 is split at 55 and clamped to the control shaft 47 by the screw 56. The angular position of the dog 54 relative to the hand levers 51 and 52 may be varied by loosening screw 56 and turning the dog 54 on the shaft 47.

The valve 42 is of the quick or snap acting type. Dog 54 engages the adjustable stops 112 and 113 which are threaded into the ends of the arms of the V-shaped valve operating member 114. Lock nuts 115 serve to hold the stops in position. By changing the positions of stops 112 and 113 the time at which valve 42 is thrown from one position to the other is regulated.

The cutting tool 57 is held in position on the cross slide 58 by tool bracket 59 and the clamp 60. When the clamp 60 is released the tool 58 can be moved toward or away from the stock 3 as desired. The cross slide 58 which carries the tool 57 is slideably mounted on the slideway 61 which is attached to the bed 2 by the screws 62. A rack 63 is attached to the bottom of cross slide 58 and meshes with a pinion 64 which is mounted on the control shaft 47. Thus the cross slide 58 and tool 57 are moved toward or from the stock 3 when the control shaft 47 is rotated. When the shaft 47 as shown in Fig. 9 is turned clockwise the tool 57 will be fed toward the stock 3 and when it is turned counter-clockwise the tool 57 will be withdrawn from the stock 3. Lubricating fluid may be supplied to the cutting point of the tool 57 through the pipe 65.

An adjustable stop support 66 is provided for supporting the stop for measuring the length of stock to be cut off. The stop support 66 is clamped to the end of the adjusting screw 67 by means of the screw 68. The screw 69 and washer 70 aid in securing stop support 66 to the adjusting screw 67. The adjusting screw 67 is supported by the upright arms 71 of the sliding bracket 72. Bracket 72 slides on the bed 2 of the machine and may be clamped in any desired position by the clamp 73. The adjusting nuts 74 and 75 are threaded to fit the screw 67 and are used to accurately adjust the position of the stop support 66. As shown in Fig. 1, when the nuts 74 and 75 are both turned in one direction, for example clockwise when looking at them from the right end of the machine, the adjusting screw 67 will be moved to the right. When the nuts 74 and 75 are turned counter-clockwise the screw 67 will be moved to the left. A keyway 76 is cut in the screw 67 and keys in the supporting arms 71 fit in it and keep the screw 67 and stop support 66 from turning. The nuts 74 and 75 must both be tightened against the arms 71 to hold the screw 67 in the desired position.

The head 77 of the stop support 66 forms a bearing for the shaft 78. The stop face 79 is rigidly attached to one end of shaft 78 and has a cam surface 80 which co-acts with the cam surface 81 on the top support head 77.

A spring 82 pushes on the collar 83 which is attached to shaft 78. The spring pressure keeps the cam surfaces 80 and 81 in contact. These cam surfaces 80 and 81 are a part of the means for withdrawing the stop face 79 from contact with the work after the desired length has been measured. Fig. 8 shows the stop face 79 in withdrawn position while in Fig. 11 shaft 78 has been turned and the cam 80 has slid on cam 81 causing the stop face 79 to be moved to the left into its stock measuring position. When the stop face 79 moves to the left the shaft 78 and collar 83 move also and the spring 82 will be compressed. The pressure of the spring 82 holds the flat part of cam 80 against the flat part of cam 81, thus accurately positioning stop face 79.

A forked lever 84 is keyed to shaft 78 adjacent the collar 83 as seen in Fig. 10. The upper end of stop operating link 85 is pivoted on the pin 86. This pin 86 is supported by the arms 87 and 88 of the lever 84 and is held in place by washer 90 and cotter pin 91. The space between the two arms 87 and 88 is greater than the thickness of link 85 and link 85 is made with a sliding fit on pin 86. Thus, when the stop face 79 and shaft 78 are advanced and withdrawn by the cam surfaces 80 and 81, the lever 84 will move with the shaft 78.

The lower end of link 85 is attached to the lever 92 by means of pin 93. Pin 93 is held in place by cotter pin 94 and washer 95. The lever 92 is adjustably clamped on operating shaft 47 by the screw 96 as shown in Fig. 10.

The full lines in Fig. 10 show the parts of the stock measuring mechanism in the position shown in Fig. 8. In this position the stock has been measured and the stop face 79 has been withdrawn out of contact with the stock. When shaft 47 is rotated so that lever 92 is moved from the position shown in solid lines to that shown in dotted lines in Fig. 10, the link 85 and upper lever 84 will be moved into the positions shown in dotted lines. When the parts are moved from the position shown in solid lines in Fig. 10 to the position shown in dotted lines in Fig. 10 and in the fragmentary view Fig. 11, the lever 92 is lifted, also lifting lever 84 by means of link 85. As shaft 78 is turned by lever 84 the inclined portion of cam face 80 will slide up on the inclined part of stationary cam 81 until the flat surfaces of the cams are in contact; the stop face 79 is then in the stock measuring position and the spring 82 is compressed as shown in Fig. 11.

To remove the stop face from its measuring position the control shaft 47 is rotated to lower lever 92. This movement rotates shaft 78 and spring 82 causes the cam 80 to slide down on cam 81 until the parts are in the position shown in Fig. 8.

The control shaft 47 may be actuated either by the hand levers 51 or 52 or by the hydraulic cylinder 97. On light gauge tube the effort required to cut off the stock is small and the machine can be operated manually without tiring the operator. On heavy gauge tube or solid stock however it is desirable to have some power operated means of feeding the tool through the stock as the force required is too great for continued manual operation.

A piston 98 operates in the cylinder 97. The bracket 99 is bolted to the frame of the machine and supports the cylinder 97. The packing 101 may be kept tight around the piston rod 102 by adjusting the position of supporting sleeve 100 by means of bolts 106. Sleeve 100 also acts as a support for the outer end of piston rod 102. A rack 103 is cut in the piston rod 102. This rack meshes with the gear segment 104 which is split and clamped to control shaft 47 by the bolt 105. The bracket 99 and sleeve 100 are cut out as shown in Fig. 12 to accommodate gear segment 104. It will be understood that gear segment 104 may be operatively disconnected from the shaft 47 by loosening the bolt 105.

The supply pipes 107 and 108 are connected to opposite ends of the hydraulic cylinder 97 and serve to conduct the fluid under pressure to and from the cylinder. In order to provide a variable speed of travel in either direction for piston 98 a variable displacement pump 109 of well-known type is provided. As shown in Fig. 1 it is built in the base 1 of the machine and is driven by the motor 110. The supply pipes 107 and 108 from the cylinder 97 are connected to the pump 109. A control handle 111 is mounted in a convenient position on the front of the machine and is adapted to operate the valves on the variable displacement pump which determine the fluid pressure in pipes 107 and 108 and through them on the piston 98 in the cylinder 97.

The difference in pressure of the fluid on opposite sides of piston 98 determines the direction and speed of movement of piston rod 102 and, through rack 103 and gear segment 104, of the control shaft 47. Thus if the total fluid pressure on each side of piston 98 is equal there will be no movement but as soon as there is a difference the piston will start to move toward the side on which there is the least pressure. The operation of this type of variable pressure pump and hydraulic cylinder is well known to those skilled in the art and need not be explained in detail here.

The cycle of operations of my machine is the same whether control shaft 47 is operated manually or by the hydraulic means above described. Assume that the machine is in the position shown in Fig. 1 with gear segment 104 loose on shaft 47 and the operator is controlling the machine by the hand lever 52. The tube is held by the chuck and tool 57 is being withdrawn from the stock. The operator pulls down on lever 52. This rotates shaft 47 which throws dog 54 against stop 113 on the fluid pressure valve 42. While valve 42 is being thrown to its other position the link 85 is being lifted by the movement of lever 92. This turns shaft 78 and causes stop face 79 to be moved out into its stock measuring position. When lever 52 has been moved down to the position shown in Fig. 6 the valve 42 has been thrown. This causes the chuck to release the stock and feed rolls 19 and 20 to contact with the stock and feed it forward until it strikes the stock measuring stop 79. The operator next lifts lever 52. This causes dog 54 to contact with stop 112 and throw valve 42 to its other position (Fig. 4). When valve 42 is in this position the chuck grips the stock and the feed rolls 19 and 20 are removed from contact with the stock. As lever 52 is lifted the stock stop face 79 is withdrawn from contact with the end of the stock. This however takes place after the valve 42 has been thrown and the chuck has gripped the stock. The measured length of stock is next cut off by lifting the lever still higher and feeding the cut-off tool 57 through the stock. When the stock is cut off and tool 57 has been withdrawn slightly by lowering lever 52 the machine is again in the position shown in Fig. 1.

The cycle of operations of the machine is exactly the same whether control shaft 47 be operated by hand levers 51 or 52 or by the hydraulic cylinder 97. If operated by the hydraulic cylinder, the operator merely moves the control handle 111. This handle 111 operates the valves which automatically give the desired predetermined speed and direction of rotation to control shaft 47.

It will be evident to those skilled in the art that the elements of my machine may be varied from the form shown and described in this application without departing from the scope of my invention and I therefore do not limit this application to the exact machine shown and described herein.

I claim:—

1. In a machine of the class described, a fluid pressure operated stock chuck and roller feed, a cutting tool supporting slide adapted to support a cut-off tool and to be fed toward and away from the stock, a stock measuring stop adapted to be withdrawn from and returned to its measuring position, a shaft, valve means adapted to be operated by said shaft and to control the operation of said stock chuck and roller feed, means on said shaft to operate said cutting tool supporting slide, means on said shaft to operate said stock measuring stop, and means for actuating said shaft.

2. A machine tool having a hollow rotatable spindle, means for rotating said spindle, a stock chuck, a roller feed, fluid pressure actuated means for operating said stock chuck and roller feed, a valve controlling said fluid pressure actuated means, a tool slide adapted to support a cutting tool and be fed toward and away from the stock, a stock measuring stop, means for withdrawing said stock measuring stop from its measuring position and returning it thereto, a control shaft adapted to control the operation of said valve, said tool slide and said stock measuring stop, and means for operating said control shaft.

3. In a hollow spindle machine tool having fluid pressure operated stock feeding and chucking means, a valve adapted to control said fluid pressure operated stock feeding and chucking means, a rotatable shaft, means on said shaft for operating said valve, a cutting tool, means on said shaft for feeding said cutting tool, a stock measuring stop, means connected to said shaft for withdrawing said stock measuring stop from its measuring position and returning it thereto, and means for operating said shaft.

4. In a machine tool having stock feeding and chucking means, a cutting tool and a stock measuring stock a rotatable control shaft, means on said control shaft for actuating said stock feeding and chucking means, cutting tool and stock measuring stop, fluid pressure operated means for rotating said shaft and control means to regulate the speed and direction of rotation of said shaft.

5. In a machine tool the combination of automatic stock feeding and chucking mechanism, a cutting tool, a stock measuring stop adapted to be withdrawn from contact with the stock, a control shaft adapted to control the stock feeding, chucking, cutting off and measuring operations of said machine tool and fluid pressure operated means for rotating said shaft.

6. A cut-off machine combining stock feeding and chucking mechanism; fluid pressure operated means for operating said stock feeding and chucking mechanism comprising a cylinder, a piston movable in said cylinder and connected to operate said stock feeding and chucking mechanism and a valve controlling the flow of fluid under pressure into and out of said cylinder; a cut-off tool movable transversely of said machine; a stock measuring stop; and a control shaft having attached to it means for operating said valve, means for transversely moving said cut-off tool and means for withdrawing said stock measuring stop from its measuring position and returning it thereto; and means for operating said control shaft.

7. In a machine tool, the combination of fluid pressure actuated stock feeding and chucking means, a valve for controlling the operation of said stock feeding and chucking means, a cutting tool adapted to be moved into and out of cutting position, a rotatable shaft, means on said shaft for actuating said valve, means actuated by said shaft for moving said cutting tool into and out of its cutting position and means for rotating said shaft.

8. In a machine tool, the combination of fluid pressure actuated stock feeding and chucking means, a valve for controlling the operation of said stock feeding and chucking means, a cutting tool adapted to be moved into and out of cutting position, a stock measuring stop adapted to be withdrawn from and returned to its stock measuring position, a rotatable shaft, means on said shaft for actuating said valve, means on said shaft for moving said cutting tool into and out of its cutting position, means actuated by said shaft for withdrawing said stock measuring stop from and returning it to its measuring position and means for rotating said shaft.

9. In a machine tool the combination of stock feeding and chucking means, a cutting tool adapted to be moved into and out of cutting position, a stock measuring stop adapted to be withdrawn from and returned to its cutting position, a control shaft, means on said control shaft for controlling the operations of said stock feeding and chucking means, cutting tool and stock measuring stop, a cylinder, a piston in said cylinder, a supply of fluid under pressure, fluid conducting means between said supply and said cylinder, means actuated by the movement of said piston to rotate said shaft in one direction or the other depending on the direction of movement of said piston in said cylinder and valve means for controlling the flow of fluid under pressure to said cylinder to regulate the movement of said piston.

10. In a machine of the class set forth, the combination of a hollow spindle and means for driving it, a feeder for feeding stock through said spindle, a clutch for holding the said stock while being cut off, a cutter adapted to advance toward and from the stock, a stock-stop, a rock shaft and means for rocking it back and forth, and mechanism actuated by said shaft when it is rocked in one direction to put the feeder into action and the clutch out of action and when rocked in the opposite direction to put the clutch into action as well as the cutter.

11. In a machine of the class set forth, the combination of a hollow spindle and means for driving it, a feeder for feeding stock through said spindle, a clutch for holding the said stock while being cut off, a cutter adapted to advance toward and from the stock, a stock-stop, a rock shaft and means for rocking it back and forth, and mechanism actuated by said shaft when it is rocked in one direction to put the feeder into action and the clutch out of action and when rocked in the opposite direction to put the clutch into action as well as the cutter, said stock-stop embodying an adjustable support, a longitudinally movable rock shaft journaled in said support carrying a stop-member, a spring normally tending to move said stop-member away from the stock, cam surfaces being provided between said support and said stop member for the purpose set forth.

EARL J. HORNBERGER.